Sept. 10, 1968  E. MADDEN  3,400,575
CONTAMINANT SAMPLING APPARATUS AND METHOD
Filed Jan. 28, 1966
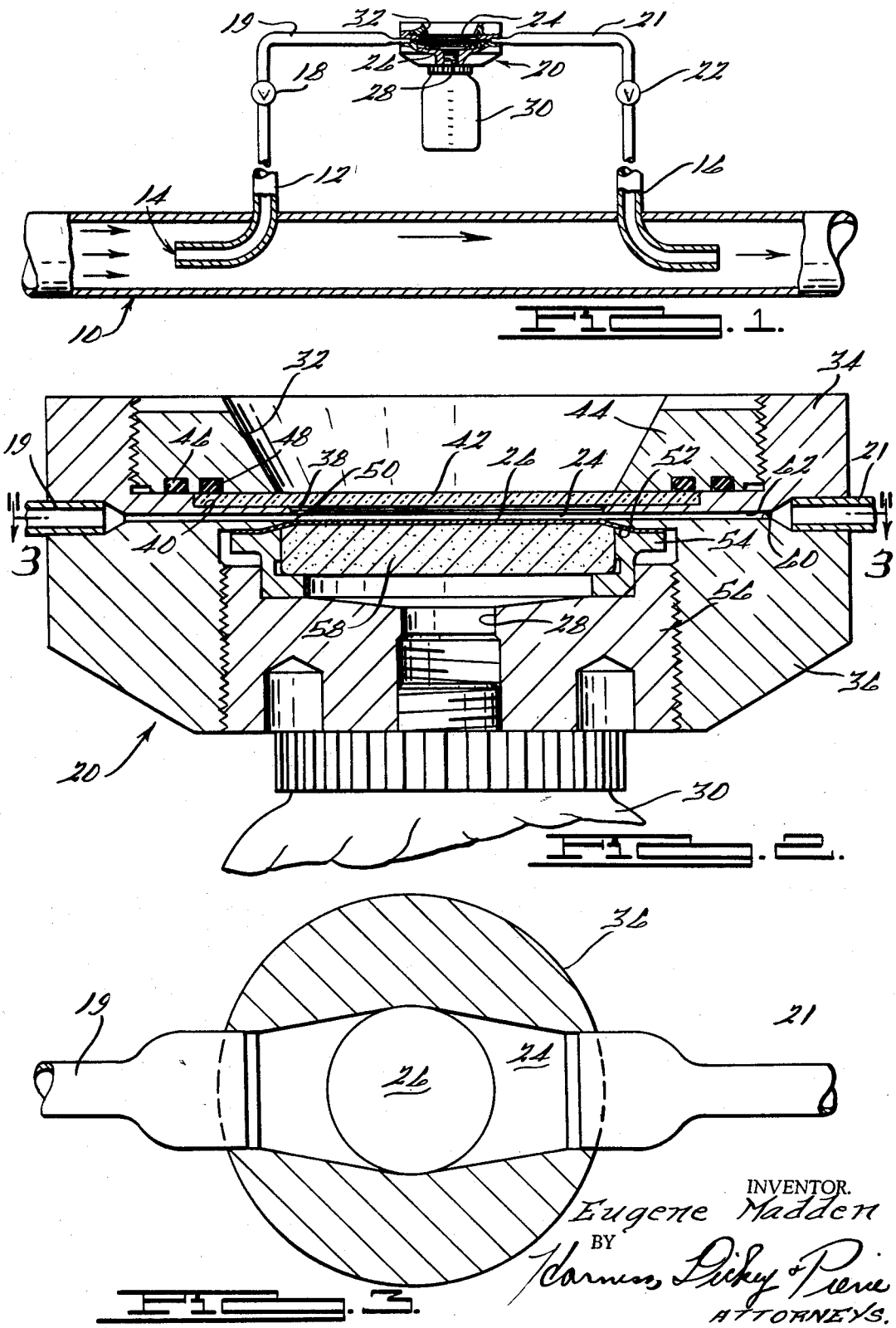
INVENTOR.
Eugene Madden
BY
Harness, Dickey & Pierce
ATTORNEYS.

United States Patent Office 3,400,575
Patented Sept. 10, 1968

3,400,575
CONTAMINANT SAMPLING APPARATUS
AND METHOD
Eugene Madden, Detroit, Mich., assignor to Cox Instruments Division, Lynch Corporation, Detroit, Mich., a corporation of Indiana
Filed Jan. 28, 1966, Ser. No. 523,661
6 Claims. (Cl. 73—61)

ABSTRACT OF THE DISCLOSURE

A fluid sampling apparatus for sampling the particulate contamination content of a fluid in which the fluid to be sampled is flowed across the surface of a filter membrane and then through the filter.

---

This invention relates to contaminant sampling apparatus and techniques.

In the handling of a variety of fluids, including, for example, liquids such as fuels, it is necessary as an element of controlling the degree of contamination of the fluid with particulate matter, to ascertain the degree to which the fluid is in fact contaminated with particulate matter from time to time. In the customary practice, this is accomplished by sampling the fluid flowing in a pipe or conduit, filtering the fluid and inspecting the surface of the filter to form a quantitative estimate of the extent of the contamination. All known techniques of that general nature involve the difficult problem of insuring that there is no contamination of the sample during the entire sampling procedure. For example, in removing the sample, it is customarily necessary with those techniques to change the condition of a valve which is upstream of the point at which the sample is discharged into a sampling bottle or beaker, and that change of condition in itself has been found to tend to produce contamination of the fluid, with the result that the extent of the particulate contamination of the sample is not fairly representative of the extent of the particulate contamination of the fluid. Even avoiding spurious contamination from the air or sampling flask is difficult with those techniques.

Alternatives have been proposed including, for example, an electronic technique for scanning or measuring the extent of the particulate contamination of the flowing fluid in the pipe, but it is understood that such apparatus is quite expensive and is not always capable of providing an adequately accurate determination of the extent of the contamination.

An object of this invention is to reduce the cost and improve the accuracy and simplicity of sampling the particulate contamination of fluids.

Another object of this invention is to reduce the possibility of spurious contamination of a fluid sample during a sampling procedure.

The apparatus and method which is the subject of this invention will be understood from the following detailed description of a representative apparatus and method when read with reference to the accompanying drawings in which:

FIG. 1 is a schematic representation of the sampling circuit including the sampling apparatus;

FIG. 2 is a sectional view of the sampling apparatus schematically represented in FIG. 1; and FIG. 3 is a sectional view taken substantially along the line 3—3 of FIG. 2.

Referring to FIG. 1 of the drawings, the fluid which is to be sampled flows longitudinally of pipe or conduit 10. In order to sample that fluid, a suitable sample-inflow port 12 is inserted within that conduit. In the preferreed arrangement, port 12 is of a type classified as an isokinetic port and comprises a piece of tubing sealed to pipe 10 and projecting its open end 14 upstream. In the preferred arrangement, the opening 14 is centered within pipe 10 to sample the core of the flowing fluid. A sample-outflow port (which may be and is illustrated to be similar to port 12) is disposed in pipe 10 at a point downstream from port 12.

The sampling circuit comprises, in series, port 12, upstream valve 18, inflow pipe 19, sampling apparatus 20, outflow pipe 21, downstream valve 22, and port 16. Sampling apparatus 20 comprises a thin chamber 24 disposed above a filter medium 26 and connected at opposite ends with valves 18 and 22 by pipes 19 and 21, respectively. With both valves 18 and 22 open, a selected percentage (such as 10%) of the fluid flowing in conduit 10 as it is admitted into port 12 and flows through valve 18, through chamber 24, through valve 22, and via port 16 back into the main fluid-flow stream. The system is preferably designed so that the pressure drop in this circuit is quite small, such as one p.s.i. The flow of the fluid in the noted sampling circuit tends to remain in step or in phase with the flow of fluid in the main pipe or conduit 10. As a result, the velocity of the fluid flowing through the very thin chamber 24 is high relative to the velocity of the fluid flow in the pipe 10. In a preferred arrangement, the system was designed so that the velocity of the fluid flow through the chamber 24 was about ten times as great as the velocity of the fluid flow in pipe 10, as for example, 250 feet per second as compared to 25 feet per second.

The upper surface of the filter medium (or filter membrane) 26 defines and is coplanar with the bottom of the chamber 24 and is preferably relatively smooth. As a result, the fluid flowing at high velocity forcefully washes the surface of the filter medium 26 free of any pre-existing contamination so that the degree of particulate contamination in chamber 24 adjacent filter medium 26 accurately reflects, during this condition of continuing flow, the degree of particulate contamination of the main fluid stream in pipe 10.

When it is desired to sample the extent of the particulate contamination of the fluid in conduit 10, valve 22 is closed. As with any valve, the action of changing the condition of the valve may introduce particulate contaminants into the controlled fluid, but these contaminants will remain adjacent valve 22 and will not affect the sample. Upon the closure of valve 22, the pressure in chamber 24 rises sufficiently to force the fluid through the filter medium 26 and via an outflow port 28 into a graduated container 30. A preselected volume of fluid is permitted to flow in this path, that volume being measured, for example, by graduations on container 30. This fluid is not the sample and the container need not be clean since its sole function is to measure.

When that preselected volume (such as 100 milliliters) has been flowed, valve 18 is closed. Again, the act of closure of valve 18 may introduce contaminants into the fluid but upon the closure of that valve the fluid in the sampling area becomes static, that is, the flow ceases, so that any contaminants introduced in the fluid in the region of valve 18 remain in that region and are not introduced into the sampling apparatus 20.

The flow of the fluid through the filter medium 26 during this sampling interval results in the deposition upon the surface of the filter medium of the particulate contaminants contained in the fluid which flows through that filter medium. As soon as valve 18 is closed, the flow ceases and the deposition ceases. Conditions are static and the extent of the particulate deposition upon the upper surface of filter medium 26 may then be ascertained in any suitable fashion such as by observing the upper surface of the filter medium through a viewing port 32, normally microscopically.

When the sample has been observed, valve 22 and then valve 18 are opened to reestablish the initial flow path. When it is desired to again sample the fluid (which may be promptly if there is any question as to whether the first sample accurately reflected conditions in the main fluid flow path), the above steps are repeated.

A suitable form of sampling apparatus 20 is illustrated in FIGS. 2 and 3 of the drawings. The sampling apparatus disclosed in those drawings comprises upper and lower housing portions 34 and 36 secured together in any suitable fashion. Upper housing section 34 comprises a central aperture 38 bounded by an annular shoulder 40 which supports a thin optical viewing glass 42. Glass 42 is desirably as thin as feasible commensurate with the requisite strength requirements. Viewing glass 42 is clamped in place by means of an annular viewing ring 44 (the inner surface of which defines the viewing port 32) which is screwed within or otherwise secured to upper housing portion 34. A fluid-tight seal is established between viewing ring 44 and both the viewing glass 42 and the upper housing section 34 by means such as O rings 46 and 48.

Lower housing portion 36 includes a central aperture 50 (coaxial with aperture 38) defined by an annular shoulder 52. An annular backup support 54 seats against shoulder 52 and is retained in place by a support retainer 56 which is screwed or otherwise retained in the lower housing portion 36.

Backup support 54 carries a media backup member 58 which is made of a material which is pervious to the fluid being sampled and preferably impedes the flow of the fluid therethrough as little as possible consistent with the performance of the backup function. Sintered bronze and stainless steel are recommended.

The filter medium 26 is preferably in the form of a thin filter membrane of any of a variety of types which are commercially available. For example, it could be a thin cellulose acetate filter member designed to filter out particulate contaminants of a size equal to or greater than ½ micron, for example. That membrane rests upon the upper surface of the media backup member 58 and its peripheral edges are trapped between shoulder 52 and the adjacent surface of the backup support 54.

The inner annular portion of the lower housing portion 36 which defines the shoulder 52 is tapered so that the upper surface of the filter medium 26 is substantially coplanar with the upper surface 60 of the lower housing portion 36. The lower surface 62 of the upper housing portion 34 and the lower surface of the viewing glass 42 are spaced above the upper surface of the filter medium 26 to define the thin chamber 24. The pipe 19 (FIG. 1) which carries the fluid from the valve 18 to the sampling apparatus 20 preferably converts from a circular cross section to a thin wide rectangular internal cross section proximate the apparatus 20, and that cross section of the pipe 19 is clamped between the housing portions 34 and 36 so that fluid carried by that pipe is communicated to the chamber 24. The chamber 24 widens from the point of admittance to the central area of the apparatus 20 and then correspondingly narrows again to communicate with the correspondingly shaped outflow pipe 21, as may best be seen in FIG. 3 of the drawings. As a result, there is a smooth transition of the shape of the transverse cross section of the flowing fluid from circular to oval or rectangular and then, in the sampling area, to a wide thin sheet or film of fluid, with a corresponding counter-transition as the fluid flows to the outflow pipe 21. By keeping the thickness of the liquid to a minimum above the filter medium 26, the viewing distortions which could result from refraction or absorption of the light in passing through the liquid are minimized. As a specific example, in one unit, in which the exposed diameter of the filter medium was about 35 mm., the distance between the filter medium and the viewing glass was less than one-eighth of an inch.

Preliminary to sampling, fluid flows from pipe 19 through the chamber 24 and out pipe 21, flowing at a high velocity over the surface of filter medium 26 so as to cleanse that surface and physically dislodge any particles which were previously statically disposed thereon. When the outflow valve 22 (FIG. 1) is closed, fluid can no longer flow out of pipe 21 (FIG. 2) and as a result a pressure increase occurs in chamber 24 which forces fluid through filter medium 26, through the media backup member 58, and via outflow port 28 formed in the support retainer 56. The pressure drop across filter medium 26 and backup 58 is sufficiently small (e.g., 0.1 p.s.i.) so that the forces are not adequate to drive the particulate contaminants into the surface of the smooth filter medium 26. As a result, upon the next cleansing operation, all such particulate contaminants are flushed away.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. The method of sampling the particulate contamination content of a fluid which comprises the steps of flowing a portion of said fluid from an inflow port to an outflow port parallel with and across the surface of a filter membrane, terminating flow through the outflow port and flowing the fluid from the inflow port through the filter membrane, and thereafter terminating the inflow of the fluid through the inflow port.

2. The method of claim 1 in which the fluid is flowed parallel with and across the surface of the filter membrane as a thin sheet and at relatively high velocity and is flowed through the filter membrane at relatively low velocity.

3. The method of sampling the particulate contamination content of a fluid which comprises the steps of dynamically flowing the fluid across the face of a filter medium to remove therefrom pre-existing static particulate contaminants, directing the fluid to be sampled through the filter medium to collect particulate contaminants in the sampled fluid, and thereafter terminating all flow of fluid through and across the filter membrane.

4. The method of claim 3 further including the steps of viewing the surface of the filter media, and thereafter again dynamically flowing the fluid across the face of the filter medium to remove therefrom the deposited particulate contaminants.

5. The method of claim 3 in which the fluid is flowed across the face of the filter medium at relatively high velocity and is flowed through the filter medium at relatively low velocity.

6. A sampling apparatus for sampling fluid flowing in a pipe comprising first and second sampling ports connected to the pipe at spaced points thereon, means defining an elongated chamber having a flat filter membrane as one wall thereof, and having inflow and outflow ports, and means for selectively flowing fluid from the pipe across the surface of said filter membrane and for flowing fluid through said filter comprising first connecting means including first valve means for connecting said first sampling port to said inflow port and second connecting means including second valve means for connecting said outflow port to said second sampling port.

References Cited

UNITED STATES PATENTS

| | | | |
|---|---|---|---|
| 1,969,626 | 8/1934 | Simon et al. | 73—28 XR |
| 2,475,857 | 7/1949 | Reinert | 73—421.5 |
| 3,177,706 | 4/1965 | Shuman et al. | 73—61 |
| 3,236,095 | 2/1966 | Gelder | 73—61 |

DAVID SCHONBERG, *Primary Examiner.*